US009081962B2

(12) United States Patent
Harkness

(10) Patent No.: US 9,081,962 B2
(45) Date of Patent: Jul. 14, 2015

(54) ANTI-TAMPER TECHNIQUES

(76) Inventor: Graeme Harkness, Glasgow (GB)

( * ) Notice: Subject to any disclaimer, the term of this patent is extended or adjusted under 35 U.S.C. 154(b) by 514 days.

(21) Appl. No.: 12/433,234

(22) Filed: Apr. 30, 2009

(65) Prior Publication Data

US 2009/0276857 A1 Nov. 5, 2009

Related U.S. Application Data

(60) Provisional application No. 61/049,121, filed on Apr. 30, 2008.

(51) Int. Cl.
G06Q 99/00 (2006.01)
G06F 21/57 (2013.01)
G06F 21/14 (2013.01)
G06F 21/00 (2013.01)

(52) U.S. Cl.
CPC ............... *G06F 21/57* (2013.01); *G06F 21/14* (2013.01); *G06F 21/00* (2013.01); *G06Q 99/00* (2013.01); *G06Q 2220/10* (2013.01)

(58) Field of Classification Search
CPC ..... G06F 21/00; G06Q 99/00; G06Q 2220/10
USPC ............................................. 705/51; 726/26
See application file for complete search history.

(56) References Cited

U.S. PATENT DOCUMENTS

| 4,142,243 | A | * | 2/1979 | Bishop et al. ................... 714/37 |
| 5,459,865 | A | * | 10/1995 | Heninger et al. ............. 718/108 |
| 7,447,912 | B2 | * | 11/2008 | Jakubowski et al. ......... 713/187 |
| 7,757,097 | B2 | * | 7/2010 | Atallah et al. ................. 713/187 |
| 8,161,463 | B2 | * | 4/2012 | Johnson et al. ............... 717/136 |
| 8,510,571 | B1 | * | 8/2013 | Chang et al. .................. 713/191 |
| 2003/0023856 | A1 | | 1/2003 | Horne et al. |
| 2003/0188231 | A1 | | 10/2003 | Cronce |
| 2006/0026569 | A1 | | 2/2006 | Oerting et al. |
| 2006/0031686 | A1 | * | 2/2006 | Atallah et al. ................. 713/190 |
| 2006/0047955 | A1 | | 3/2006 | Prevost et al. |
| 2006/0136750 | A1 | * | 6/2006 | Jakubowski et al. ......... 713/193 |

FOREIGN PATENT DOCUMENTS

EP 1681609 7/2006
JP 2002258961 9/2002

(Continued)

OTHER PUBLICATIONS

International Search Report on corresponding PCT application (PCT/GB2008/003318) from International Searching Authority (EPO) dated Dec. 12, 2008.

(Continued)

*Primary Examiner* — James D Nigh
(74) *Attorney, Agent, or Firm* — Klein, O'Neill & Singh, LLP

(57) ABSTRACT

Anti-tamper techniques for protecting a program code portion against tampering provide for defining a sequence of code segments having a root-code segment and a plurality of sub-code segment. Each sub-code segment is provided with an integrity checking portion for checking the integrity of a target code segment. At runtime, the integrity checking portion of a given sub-code segment carries out a checking procedure on the respective target code segment to obtain a runtime result which is compared with a reference result to verify that the target portion of the program has not been tampered with.

20 Claims, 5 Drawing Sheets

(56) References Cited

FOREIGN PATENT DOCUMENTS

| | | |
|---|---|---|
| JP | 2005100347 | 4/2005 |
| JP | 2007080051 | 3/2007 |
| JP | 2007506187 | 3/2007 |

OTHER PUBLICATIONS

Extended Search Report from EPO on co-pending EP application (08155498.2) dated Dec. 12, 2008.

Office Action on corresponding foreign application (JP Application No. 2010-527520) from the Japanese Patent Office dated Oct. 8, 2013.

Office Action on corresponding foreign application (TW Application No. 097137904) from the Taiwanese Intellectual Property Office dated Jul. 27, 2012.

Office Action on corresponding foreign application (JP Application No. 2010-527520) from the Japanese Patent Office dated Jun. 11, 2013.

* cited by examiner

Code Sequences

D - D$_{a1}$ -D$_{b1}$        D - D$_{a2}$ -D$_{b1}$

D - D$_{a1}$ -D$_{b2}$        D - D$_{a2}$ -D$_{b2}$

D - D$_{a1}$ -D$_{b3}$        D - D$_{a2}$ -D$_{b3}$

D - D$_{a1}$ -D$_{b4}$        D - D$_{a2}$ -D$_{b4}$

ANTI-TAMPER TECHNIQUES

CROSS-REFERENCE TO RELATED APPLICATION

This application claims priority, under 35 U.S.C. §119(e), from U.S. Provisional Application No. 61/049,121, filed Apr. 30, 2008, the disclosure of which is incorporated herein by reference in its entirety.

FEDERALLY SPONSORED RESEARCH OR DEVELOPMENT

Not Applicable.

BACKGROUND

The present disclosure relates generally to the field of software security and to techniques for increasing the resistance of a computer program to unauthorized tampering. In particular, the present disclosure relates to program protection techniques which seek to provide a degree of protection from unauthorized modification and/or access to program code.

In releasing a software application for execution on end users' hardware, a program developer is effectively providing a user with complete access to the program code of that application. Unfortunately, it is a fact that some end-users will attempt to compromise a software application in order, for example, to obtain illegal copies, gain unlicensed access to certain features, steal intellectual property from the application, inject malicious code, or cheat in online games. Indeed, in the context of online gaming, which often seeks to support hundreds or thousands of players simultaneously over a network, the occurrence of online cheating can seriously undermine honest players' experience of the game. Free access to executable code by unauthorized users can often result in loss of intellectual property and provides the user with an easy means for probing the application for security vulnerabilities. Also, applications may be reverse engineered and then modified to remove metering or usage control before being recompiled, ultimately resulting in a loss of revenue for the code provider.

Thus, the environment into which publishers release their programs can be considered to be a hostile one. There is therefore a need to protect programs from tampering or misuse, which may involve unauthorized modification and/or copying.

A number of anti-tamper techniques have been previously proposed for deterring would-be hackers or for protecting computer programs from being modified and/or copied. For example, it is known for software programs to utilize copy protection techniques or to have limitations encoded into them which, for example, require password or serial number access, prevent copying or restrict the use of the program in some way.

Techniques for "obfuscating" software code have also been proposed. Obfuscated code, or shrouded code as it is also known, is a type of executable code, which is intentionally made very difficult to read and understand. It is also known to employ a sub-set of obfuscation known as program-folding, e.g. to try to protect firmware in electrical equipment. Program folding involves calling routines from random places in the source-code, essentially causing the program to jump around during execution. Although obfuscated code can deter reverse engineering, there is a still a distinct possibility that the code could be read and understood, and therefore modified. As such, obfuscated code provides only low-level security means, and it is often necessary to use it in conjunction with additional security procedures, e.g. encryption. Additionally, the most common software reverse engineering attacks target copy protection schemes. These schemes generally rely heavily on existing operating system procedure calls, making basic code obfuscation easily bypassed using the same tools used with unobfuscated code. Furthermore, obfuscated code, being difficult to read and understand, is not only a problem for would-be software abusers but also for the software creators themselves, as obfuscated code is inherently very difficult to debug. As a result, it is often necessary to maintain two versions of the code: the unobfuscated code for debugging, and the obfuscated code for distribution. Due to the low level of security provided, this additional effort is often considered to outweigh the benefits of obfuscated code and therefore alternative methods are required.

SUMMARY OF THE DISCLOSURE

Preferred embodiments of the present disclosure seek to provide a program, or a portion thereof with some protection for attributes specified by the program developer, in order to try to ensure that those attributes are enforced for as long as possible. Preferred embodiments also seek to protect against the unauthorized tampering of a computer program, e.g., modification of the program, that is against the wishes of the original author or program developer. More specifically, preferred embodiments of the present disclosure seek to provide a degree of protection against unauthorized modification of the application and/or data in order to prevent an end-user from disabling attributes of the program, for example, features which serve to enforce usage/access/dissemination policies.

According to a first aspect of the present disclosure, there is provided an anti-tamper method for protecting a program code portion against tampering the anti-tamper method comprising:
  dividing said program code portion into a plurality of code segments;
  defining a sequence of said code segments, wherein said sequence of code segments comprises a root-code segment and a plurality of sub-code segments; and
  providing each sub-code segment with an integrity checking portion for checking the integrity of a target code segment, said target code segment of a given sub-code segment being the code segment that is sequentially adjacent in a checking direction towards said root-code segment;
  wherein the integrity checking portion of a given sub-code segment is operable to carry out a checking procedure on the respective target code segment to obtain a runtime result, and to compare said runtime result with a reference result.

The reader will appreciate that a "sequence" of code segments implies that code segments follow one after the other, i.e. a succession of code segments or a series of code segments forming a chain. The integrity checking functions built into each of the sub code segments therefore effectively binds the segments together to form a linked chain of checks.

It should be appreciated that, within the context of the present disclosure, a sequentially adjacent code segment refers to the adjacent code segment within the defined sequence of code sequence and not, necessarily, the physically adjacent code segment.

The sequence, or each sequence (if more than one), preferably comprises at least one segment having an attribute-defining program portion which specifies an attribute set by the developer. For example, the attribute may define a rule, a requirement of use, or a limitation to restrict or control the use of the program. Thus, it is advantageously possible for preferred embodiments of the present disclosure to allow a variety of appealing protections to be applied to candidate programs, including the ability to support business models such as up-selling to pirate users of a protected application. Furthermore, by appropriately selecting the content of the attribute-defining program portion, which will typically define a proper use policy of the application, embodiments of the present disclosure can be applied to a wide range of protection needs, such as: client protection, DRM protection, license management, intellectual property (IP) protection, pirate distribution tracing, and the like.

In the context of a computer game, the program may, for example, specify a trial period of 30 days or may limit use of the computer game up to level five. Thus, in these circumstances and according to an embodiment of the present disclosure, a code sequence may be defined in which the length of the trial period forms one attribute to be protected by the sequence. Thus, a hacker may wish to try to change the program code to lengthen the trial period or raise the allowed upper level of play. However, in the case of a program portion which has been protected by an anti-tamper method embodying the present disclosure, in order to achieve this without the inherent integrity checking system failing, the hacker would have to modify not only the code of the attribute-defining program portion, but also the code for every code segment in the code sequence to ensure that the runtime result obtained for a given target code segment could be verified with reference to the stored reference result. Whilst the modification of each code segment in this manner may not be particularly difficult, the process of making consequential changes to all the sub-code segments in the sequence in order to defeat the protection would be extremely laborious and time-consuming, and could take hundreds or even thousands of hours depending on the number of sequences of checks embedded within a given application and the number of code segments comprised in each sequence.

Preferably, the root code segment will comprise the program portion defining an attribute of the program. Although it convenient for a sequence of code segments to be defined such that the root code segment comprises, or is associated with, code or memory which specifies or defines a given attribute, it should be appreciated that the attribute-defining segment of a sequence may be any code segment, including a sub-code segment.

According to a preferred embodiment, the anti-tamper method will involve establishing the distribution or "topology" of the checks embedded in the program code portion. The defined topology represents the way in which code segments are effectively "linked" to each other within the divided source code or within the compiled code, in the sense that each integrity-checking portion will carry out a checking procedure on a specified target code segment at runtime. Preferably, a topology is established for a candidate program portion in which the code segments of that program portion define a plurality of sequences of code segments, wherein one or more code segments forms a part of more than one code sequence. A topology may be established in which one or more of the sub-code segments comprises an integrity-checking portion having a plurality of target code segments defined therefore such that, at runtime, that sub-code segment will be operable to carry out a checking procedure on more than one target code segment. According to a particularly preferred embodiment, a topology may be established for a given program portion which comprises a so-called "inverted tree structure." According to such an embodiment, the sub-code segments can be considered as forming different "levels" of the structure, with a root code segment defining the "top" of the tree, wherein every sub-code segment at a given level is operable to perform a checking procedure on each of the sub-code segments comprised in the level "above" (towards the root code segment).

The implementation of an anti-tamper method according to embodiments of the present disclosure will typically involve a reference result computation process whereby the reference result, or each reference result, of each sub-code segment is computed. This process will preferably involve carrying out a sequence of computations to obtain reference results for each of the defined sequences of code segments.

A reference result computation process that may be performed for a given code sequence according to an embodiment of the present disclosure will now be briefly described. The reference result for a first sub-code segment which is sequentially adjacent in a direction opposite to the checking direction to the root-code segment is obtained by performing an implementation checking procedure, defined by the integrity-checking portion of the sub-code segment, on its defined target code segment, namely the root code segment. This may involve carrying out a cyclic redundancy check on code or memory of the root code segment that specifies an attribute of the program to be protected, to obtain a first value or first "reference result." At runtime, the integrity-checking portion will be operable to perform a runtime checking procedure on the predefined area of memory of the root code segment in order to obtain a first "runtime result" and will be further operable to compare this runtime result with the reference result associated therewith. The integrity of the root code segment is verified according to this comparison, which may require the runtime result to be equal to the reference result or related by some predetermined relationship.

Similarly, the reference result for a second sub-code segment that is sequentially adjacent in a direction opposite to the checking direction to the first sub-code segment is obtained by performing an implementation checking procedure on its defined target code segment, namely the first sub-code segment. The implementation checking procedure is carried out, for example, on memory or code of the first code-segment that specifies the first reference result. Thus, a second reference result (which will be dependent upon the first reference result) is obtained. At runtime, the integrity-checking portion of the second sub-code portion is operable to carry out a runtime checking procedure on memory or code that specifies the value of the first runtime result, as opposed to the first reference result, and is then further operable to compare the resultant second runtime result with the second reference result associated with the second sub-code segment.

This reference result computation process continues in this manner until the (or each) reference result for each of the sub-code segments comprised in the sequence has been defined.

According to a second aspect of the present disclosure, there is provided an integrity checking method for checking the integrity of a program portion comprising a plurality of code segments, said program portion having at least one sequence of code segments comprising a root code segment and a plurality of sub-code segments, the integrity checking method comprising, for a given code segment:

i) performing a runtime checking procedure which checks the integrity of a target code segment to obtain a runtime result, said target code segment for said given sub-code segment being the code segment that is sequentially adjacent in a checking direction towards said root-code segment; and ii) comparing said runtime result with a reference result.

When an application or program portion that has been derived according to an embodiment of the first aspect of the present invention is executed within an execution environment or runtime system of a computer, the program will be operable to conduct, at runtime, an integrity checking method according to an embodiment of the second aspect. It should be appreciated that the runtime checking procedure defined for a given sub-code segment will be initiated when that sub-code segment is executed as part of the program portion.

Preferred embodiments of the present disclosure advantageously provide a robust and effective means for protecting a program portion from tampering. In order to crack or undermine the protection afforded by embodiments of the present method, in order, for example, to modify an attribute defining a proper use of the program, it would be necessary, in the case of a program protected by an anti-tamper method according to a preferred embodiment of the present disclosure, for an end-user to identify and alter the properties of every single code-segment comprised in the code sequence which is associated with that defined attribute. Thus, only by removing all the checks can the application be modified at will. While this is not an impossible task, it is an extremely laborious and time-consuming one which may take hundreds or even thousands of hours to complete. Embodiments of the present disclosure are advantageous in that they provide an effective protection mechanism which will deter hackers from making undetected modifications to an application.

In particular, preferred embodiments of the present disclosure allow one or more attributes of the program specified by the provider to be protected against unauthorized tampering by means of a large number of simple, inter-connected checks which verify the integrity of the program and of themselves. The checks are "inter-connected" in the sense that each one checks another, eventually providing a huge web of checks. This makes for a mutually self-buttressing, distributed integrity checking mechanism. Any unauthorized modification made by an end-user will be advantageously detected by this system, and attempts to circumvent these checks will preferably be prevented.

There are numerous types of checking algorithms or functions which would be suitable for the checking procedure. Preferably, the integrity checking portion of one said sub-code segments defines a checking procedure which involves performing a checksum procedure on the target code segment. This may be, for example, cyclic redundancy check.

According to a particularly preferred embodiment, a candidate application, or program code portion, is divided into code segments such that each segment comprises a function of the program code portion. This is advantageous in that it ensures that the critical components of the application are subjected to the integrity checking procedures. The segments are preferably defined to include code adjacent to a function in order to ensure that there is not code of the program portion which does not form part of a defined segment.

It is envisaged that preferred embodiments of the present disclosure will involve the insertion of a very large number of checks in a given program portion or application, for example between one thousand and ten thousand checks in an application which is a few megabytes in size. A program code portion may comprise a plurality of code sequences, such that one or more segments form part of more than one code sequence.

According to a third aspect of the present disclosure, there is provided an anti-tamper system for protecting a program code portion against tampering, the anti-tamper system comprising a computer readable storage medium having a plurality of program code segments of a program code portion stored thereon, said program code segments defining a sequence of code segments, wherein said sequence of code segments comprises a root-code segment and a plurality of sub-code segments;

wherein each sub-code segment comprises an integrity checking portion for checking the integrity of a target code segment, said target code segment for a given sub-code segment being the code segment that is sequentially adjacent in a checking direction towards said root-code segment;

and wherein the integrity checking portion of a given sub-code segment is operable to carry out a checking procedure on the respective target code segment to obtain a runtime result, and to compare said runtime result with a reference result comprised in said given sub-code segment.

According to embodiments of the first aspect of the present disclosure, it is possible for the required checking code or integrity checking functionality, i.e., an integrity checking portion and a reference portion (which comprises a reference result) for each sub-code segment, to be inserted at source code level, i.e., directly into the source code. Alternatively, it is possible for the checking code to be inserted into the application following after it has been compiled. Thus, according to an anti-tamper method of one embodiment of the first aspect, the program portion comprises source code. Alternatively, according to an anti-tamper method of another embodiment of the first aspect of the present disclosure, the program portion comprises compiled code.

The insertion of the check portions into the underlying application or program portion, either as source code or as object code, may be achieved in a number of ways. For example, it is possible for the checks to be inserted in the code manually, whereby a program developer inserts the checking code into the defined program code segments. This, however, will be very labor-intensive. Alternatively, it is possible for the integrity checking portion and the reference result to be inserted into the sub-code segments by means of pre-processing techniques involving the use of one or more macros written for this purpose.

As a further alternative, metaprogramming techniques may be useful to apply the network of checks at source code level. Such techniques may be particularly advantageous since they will allow automation of the injection of the checking portions into the application. In particular, metaprogramming techniques which utilize a data structure, such as an abstract syntax tree (AST), allow analysis of a given program code portion or application in a form that is amenable to making modifications. Thus, integrity checking portions and reference results can be conveniently installed throughout the divided segments of the application. This approach is also advantageous in that inserted checks applied at source code level are naturally hidden, or obfuscated, since they are compiled with the application code. Thus, using a source code level meta-programming approach is beneficial, in that it allows injected checks to be disguised by the optimizing compiler that runs over the resultant source code which will intersperse integrity checking code with the underlying application code.

In any of the above embodiments or aspects, the various features may be implemented in hardware, or as software modules running on one or more processors. Features of one aspect or embodiment may be applied to any of the other aspects or embodiments.

The embodiments disclosed herein also provide a computer program or a computer program product for implementing the techniques described herein, and a computer readable storage medium having stored thereon a program for implementing the techniques described herein. A computer program embodying the present invention may be stored on a computer-readable medium, or it could, for example, be in the form of a signal, such as a downloadable data signal provided from an internet website, or it could be in any other form.

BRIEF DESCRIPTION OF THE DRAWINGS

For a better understanding of the present disclosure, and to show how the same may be carried into effect, reference will now be made by way of example to the accompanying drawings in which.

DETAILED DESCRIPTION

Figure 1:
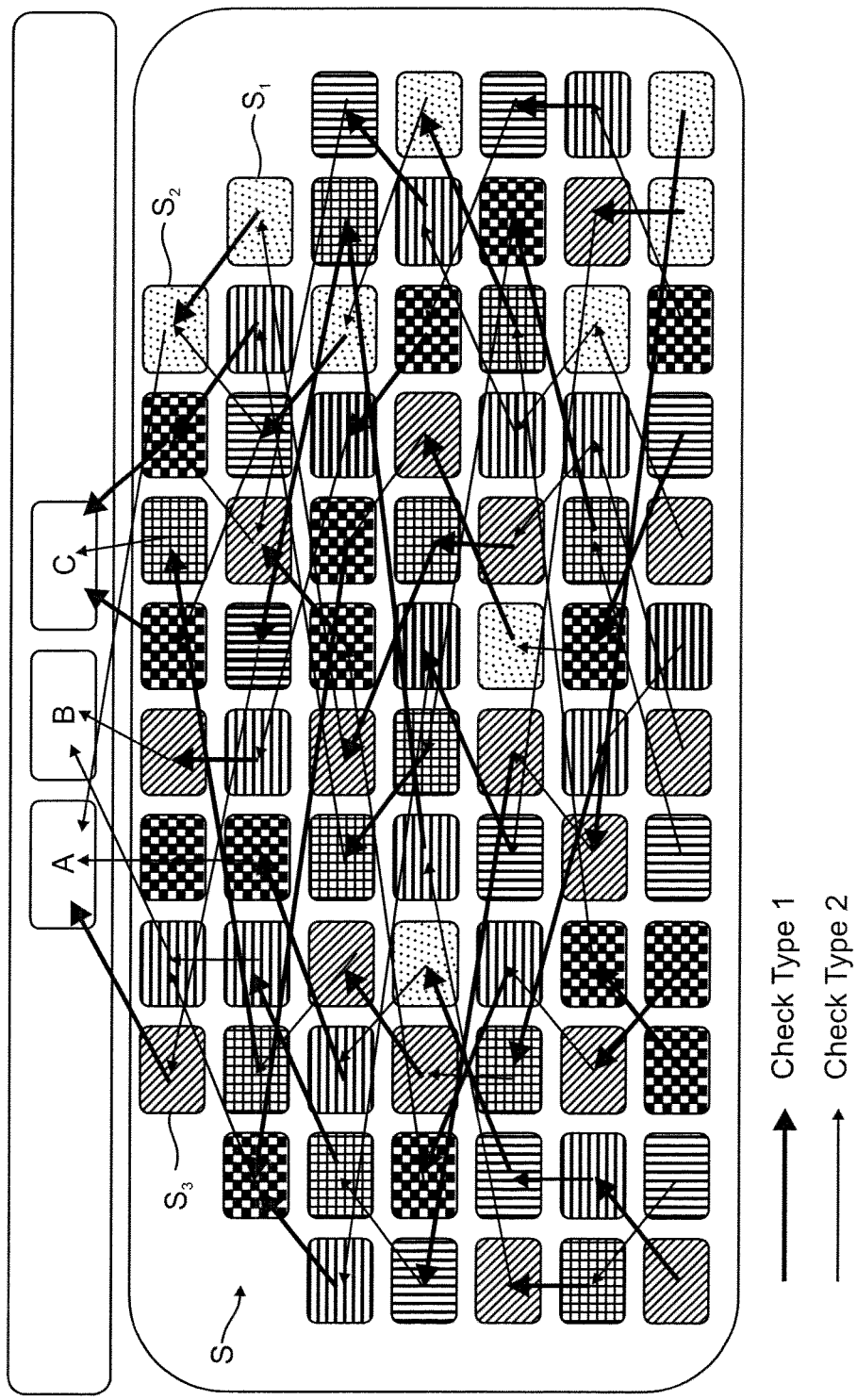
FIG. 1 illustrates an anti-tamper system according to an embodiment of the present disclosure.

FIG. 1 shows a program code portion which has been divided into a plurality of code segments comprising three root code segments A, B and C and a plurality of sub-code segments S forming eight sequences of code segments. In this embodiment, the program code portion has been compiled and, thus the positions of the sub-code segments represent their distribution throughout the compiled application.

In this embodiment, the root code segments represent segments of code which comprise defining attributes of proper use of the program which have been specified by the developer. These attributes may include, for example, limitations imposed on the use of the program or checks that are to be performed by the program, such as checking that the user of the program has purchased the full version of the application, or has a license to use the application.

The different shading of the segments represents the method that is used to disguise the presence of the checking code within the application code. Each arrow from a given sub-code segment is to a target code segment which is sequentially adjacent to the given sub-code segment in a checking direction. For example, the target code segment of sub-code segment $S_1$ is sub-code segment $S_2$. Furthermore, the target code segment of sub-code segment $S_3$ is root code segment A. The thickness of the arrow represents the type of checking process that is employed by the integrity checking portion of the originating code segment. Thus, according to this embodiment, two types of checking procedure are employed. These may be, for example, a cyclic redundancy check operable to obtain a checksum of a defined area of the target code segment to obtain a value, or some other sort of checksum or other checking method.

Figure 2:
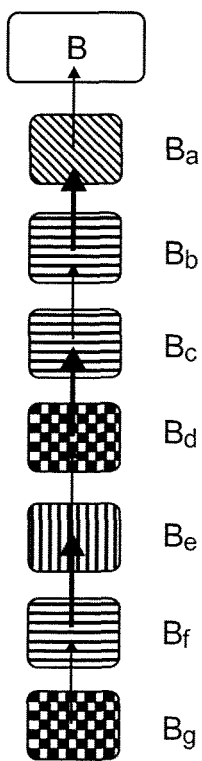
FIG. 2 illustrates a code sequence of the anti-tamper system shown in FIG. 1.

FIG. 2 shows one of the sequences of the FIG. 1 embodiment which is associated with root-code segment B. In order to compute the reference result for each of the sub-code segments $B_a$ to $B_g$, a reference result computation process is performed. This may be implemented as described below.

Specifically, according to the present embodiment, the reference result for sub-code segment $B_a$ is obtained by performing an implementation checking procedure on its target code segment, namely the root code segment B. This involves carrying out a cyclic redundancy check (for example), on a predetermined portion of memory which is associated with root code segment B and which specifies an attribute of the program, to obtain a first value or first "reference result." At runtime, the integrity checking portion will be operable to perform a runtime checking procedure on the defined part of the memory of root code segment B in order to obtain a first "runtime result," and will be further operable to compare this runtime result with the reference result associated therewith. The integrity of the root code segment is verified according to this comparison, which may require the runtime result to be equal to the reference result or related by some predetermined relationship.

Similarly, the reference result for a second sub-code segment $B_b$, is obtained by performing an implementation checking procedure on its target code segment, namely sub-code segment $B_a$.

The implementation checking procedure is carried out on a predefined area of memory associated with sub-code segment $B_a$ that contains the first reference result. Thus, a reference result for $B_b$, which will be dependent upon the first reference result for $B_a$, is derived and is subsequently stored. At runtime, the integrity checking portion of sub-code segment $B_b$ is operable to carry out a runtime checking procedure on part of memory associated with $B_a$ that stores the first runtime result (as opposed to the first reference result), and is then further operable to compare the resultant second runtime result with the second reference result associated with sub-code segment $B_b$. This reference result computation process continues in this manner until the (or each) reference result for each of the sub-code segments $B_a$ to $B_g$ has been derived and stored.

Figure 3:
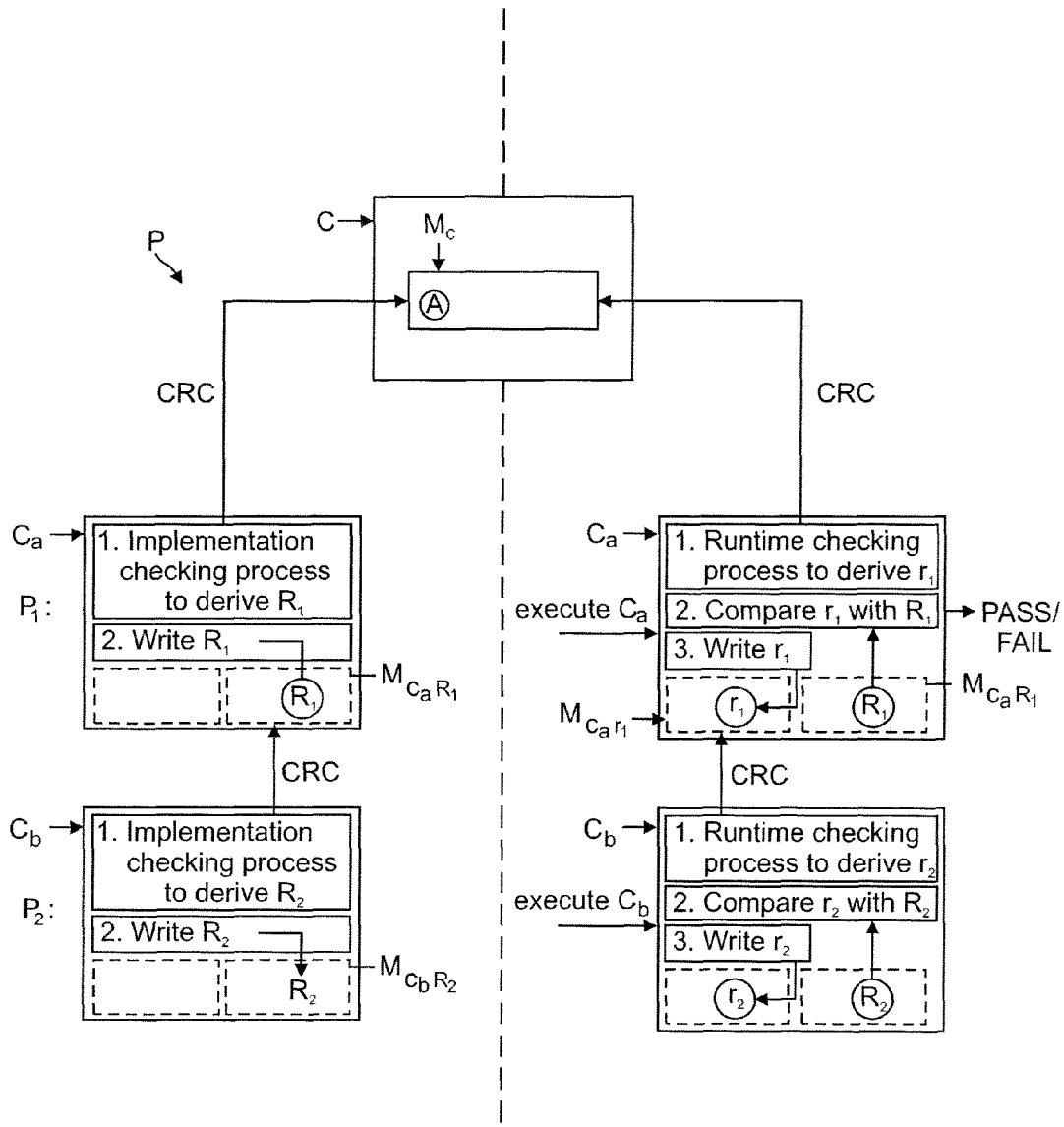
FIG. 3 illustrates a reference result computation process P according to an embodiment of the present disclosure, and an integrity checking process performed at runtime.

FIG. 3 illustrates, on the left-hand side thereof, a reference result computation process P according to an embodiment of the present disclosure, for a code sequence comprising a root code segment C and sub-code segments $C_a$ and $C_b$. Reference result computation process P comprises carrying out, in sequence, a first reference result computation process $P_1$, for defining a reference result $R_1$ of sub-code segment $C_a$, followed by a second reference result computation process $P_2$ for deriving a reference result $R_2$ of sub-code segment $C_b$. Process $P_1$ involves carrying out an implementation checking process, whereby a checksum procedure is performed on a memory portion $M_c$ of root-code segment C. Memory portion $M_c$ specifies an attribute A defined by, for example, the program developer. The checksum procedure derives a value which is employed as first reference value $R_1$. The value $R_1$ is stored/written into memory portion $M_{caR1}$. A second reference result computation process $P_2$ is performed for sub-code segment $C_b$ in which an implementation checking process comprising a checksum is performed on the memory potion $M_{caR1}$ of sub-code segment $C_a$ to derive a value which is employed as second reference value $R_2$. The value of $R_2$ is stored in memory portion $M_{cbR2}$.

The right-hand side of FIG. 3 illustrates an integrity checking method that will be performed by sub-code segments $C_a$ and $C_b$ at runtime. Thus, the integrity checking potion of sub-code segment $C_a$ is operable to perform an integrity checking method that will be initiated when, or shortly after, the execution of sub-code segment is commenced. According to the integrity checking method that is to be performed by $C_a$, a runtime checking process is carried out whereby a checksum procedure is performed on a memory portion $M_c$ of root-code segment C to obtain a runtime result $r_1$. This result is compared with the reference result $R_1$ stored in memory portion $M_{c1R1}$. According to the outcome of this comparison, the integrity checking procedure will either pass or fail. Furthermore, runtime result $r_1$ is written to memory portion $M_{car1}$. A checksum procedure performed on memory portion $M_{car1}$ will generate the same result as the same checksum procedure performed on memory portion $M_{c1R1}$ if $r_1$ equals $R_1$.

The integrity checking portion of sub-code segment $C_b$ is operable to carry out an integrity checking procedure, which involves checking the memory portion $M_{car1}$ of sub-code segment $C_b$, to obtain a runtime result $r_2$. Thus, the value of $r_2$ will depend on the value of $r_1$ obtained by the integrity checking portion of sub-code segment $C_a$. Moreover, a comparison with $r_2$ and $R_2$ will only "pass" if the comparison with $r_1$ and $R_1$ also passes.

The benefit of embodiments of the present invention can be appreciated by considering what would happen if a hacker were to modify attribute A, for example, to become A'. In this case, in order to prevent an integrity checking procedure that will be performed by $C_a$ at runtime from failing, the hacker will also have to modify the value of reference value $R_1$ so that runtime result $r_1$ compares favorably with $R_1$. Furthermore, since the validity of information stored in memory portion $M_{car1}$ will be checked by sub-code segment $C_b$, then in order to ensure that an integrity checking procedure that will be carried out by $C_b$ at runtime does not fail, it would be necessary for the hacker to modify the value of reference value $R_2$ so that runtime result $r_2$ will compare favorably with $R_2$. Effectively, in order to modify an attribute specified in the root code segment (for example), it would be necessary for a hacker to trace and modify every sub-code segment linked to that root-code segment.

Figure 4:
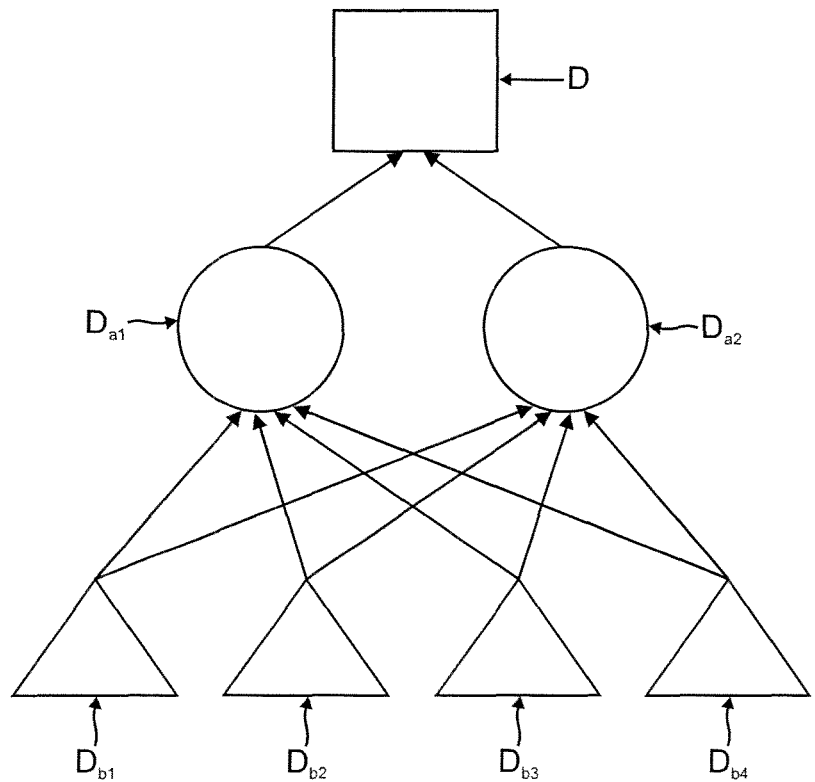
FIG. 4 shows a simplified illustration of an anti-tamper system embodying the present disclosure having an inverted tree structure.

FIG. 4 shows a simplified illustration of a candidate program portion which has been divided into a plurality of code-segments, wherein a topology of checking procedures is defined in the form of an inverted tree structure. Thus, root code portion D will be checked at runtime by two primary level sub-code segments $D_{a1}$ and $D_{a2}$. Furthermore, $D_{a1}$ and $D_{a2}$ will be checked at runtime by each of four secondary level sub-code segments $D_{b2}$ to $D_{b4}$. Thus, in this example, a total of eight sequences of code segments can be defined, with $D_{a1}$ forming a part of four sequences of code segments and $D_{b2}$ forming part of four sequences of code segments.

Figure 5:
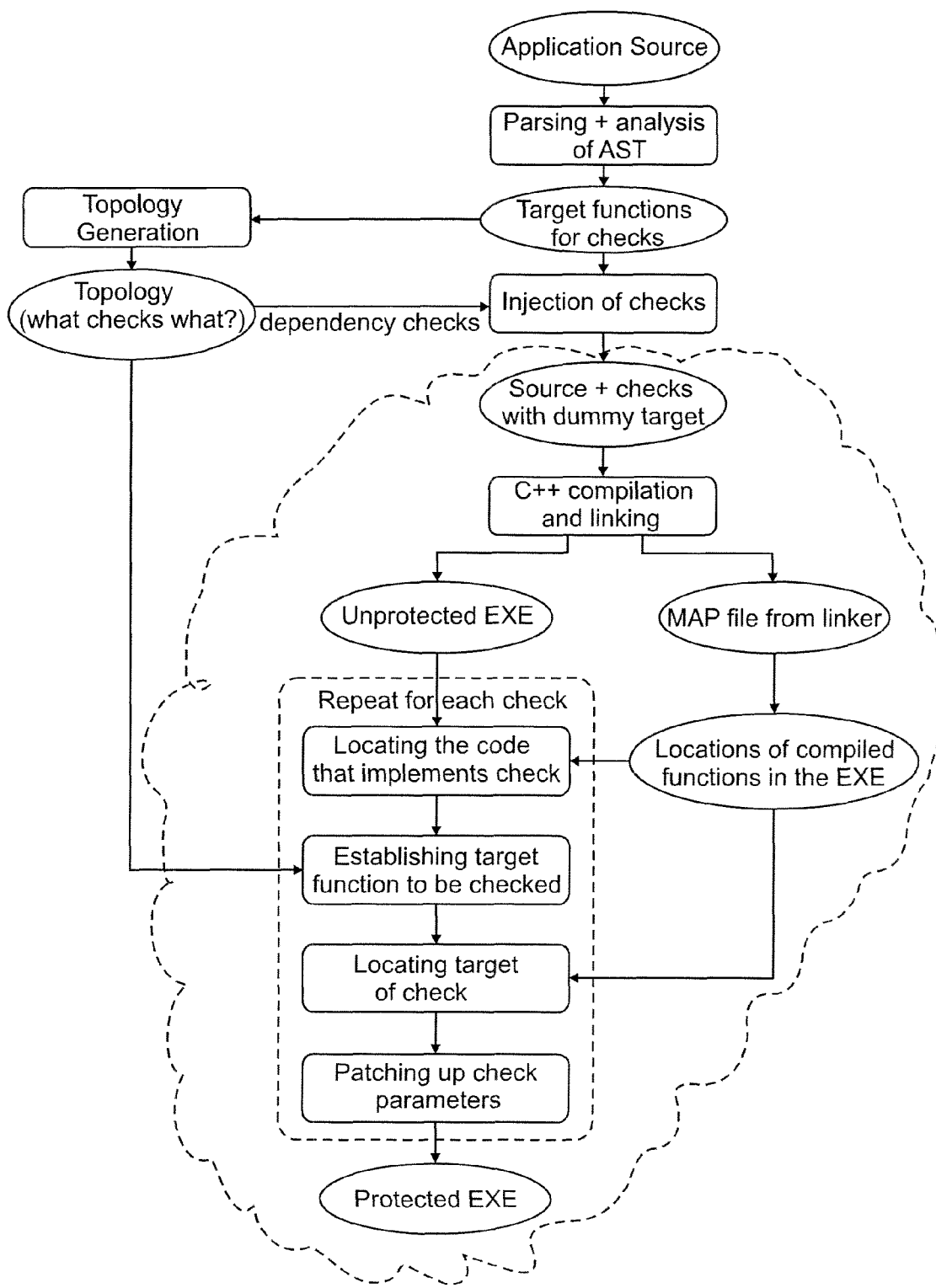
FIG. 5 illustrates the steps involved according to an anti-tamper method embodying the present disclosure utilizing meta-programming.

FIG. 5 illustrates the steps involved in an anti-tamper method embodying aspects of the present disclosure for protecting a target application against tampering. As shown by FIG. 5, the application's source code is parsed to generate a representation of it as an Abstract Syntax Tree (AST). Small meta-programs are then used to compile a set of target functions into which checking code can sensibly be inserted. Criteria used here include: the ability of the host code to adequately disguise an injected check; suitability in terms of performance (e.g., whether code in the target function is part of a time-critical inner loop); and the number of times the function is called by the application.

The target functions form the basis of the code segments into which the underlying target application is divided. The topology of the integrity checking network is determined.

Small meta-programs are used to insert checking code into the target functions. The injected code should, come runtime, contain references to the function that is to be checked. At this stage, dummy values are injected for the area of memory to check, and the value that that check should generate.

The code (with injected checks) is compiled, for example, using a standard C++ compiler into an executable (EXE) file. At the linking phase of compilation, a so-called MAP file is generated which contains information about where in the EXE the code for each application function has ended up. From this, it is possible to infer where in run-time memory these functions will reside.

A number of steps are performed for each of the target code segments which were injected with checks:
   the compiled code for these code segments is located using data from the MAP file:
   the code segment that this check should target is established (from the topology decided above);
   the code for that code segment is located using the MAP file;
   the checksum (or other integrity checking procedure) of the code for that function is computed;
   the dummy values inserted above are patched up so that this check does indeed target the one required by the topology. Furthermore, the computed checksum computed as the value that the run-time check should expect to find is inserted. If this value is not found at runtime, the code segment in question has been modified: a hack has taken place.

This process results in a protected EXE, i.e., a protected program portion or anti-tamper system embodying aspects of the present disclosure.

It is important that the checks are patched up in the correct order, i.e., starting at the "top" of a code sequence with the root code segment, and working down. The patched up functions at the top should themselves be check summed for the checks lower down.

From the above description and the accompanying drawings describing and illustrating several embodiments and examples, it should be apparent that the method and system disclosed herein can be modified, embodied, elaborated or applied in various ways without departing from the principles of the disclosure. The various embodiments and aspects disclosed herein can be implemented in software programs and data structures stored on portable storage media, transmitted by digital communications, or other transmission medium, or stored in a computer memory. Such programs and data structures can be executed on a computer, to perform methods embodying the subject matter of the present disclosure, and to operate as a machine, or part of apparatus, having the capabilities described herein.

What is claimed is:

1. A method for protecting a program code portion against alteration, said program code portion being stored in a first memory and being divided into a plurality of code segments, said program code portion comprising at least one sequence of code segments comprising a root-code segment and a plurality of sub-code segments; the method being performed by a computer having access to said first memory and comprising:
   inserting into each of said sub-code segments stored in said first memory an integrity checking portion for checking the integrity of a target code segment of the program code portion, said target code segment of given sub-code segment being the code segment that is sequentially adjacent in a checking direction towards said root-code segment;
   executing by a computer the integrity checking portion of a given sub-code segment loaded in a second memory, including carrying out a checking procedure on the respective target code segment in the second memory to obtain a runtime result, comparing said runtime result with a reference result comprised in said given sub-code of the second memory, determining that the program code portion has been altered if the runtime result is not related to the reference result, and writing said runtime result into the given sub-code segment in the second memory, such that the integrity checking procedure of a further sub-code segment sequentially adjacent in a checking direction away from said root-code segment carries out the checking procedure on the given sub-code segment in the second memory including the runtime result;

computing the reference result of the target code segment of each of said sub-code segments; and writing the computed reference results into said sub-code segments stored in said first memory.

2. The method as claimed in claim 1, wherein said integrity checking portion of one said sub-code segment defines a checking procedure which involves performing a checksum procedure on the target code segment stored in the second memory.

3. The method as claimed in claim 2, wherein the checksum procedure comprises a cyclic redundancy check.

4. The method as claimed in claim 1, wherein the program code portion is divided into code segments such that each segment comprises a function of the program code portion.

5. The method as claimed in claim 1, wherein said root code segment comprises an attribute specifying portion which defines a specified attribute of the program code portion.

6. The method as claimed in claim 1, wherein said program code portion comprises a plurality of code sequences, one or more code segments forming part of more than one code sequence.

7. The method as claimed in claim 1, comprising defining a topology to represent the arrangement of the code segments in said sequence within the program code portion.

8. The method as claimed in claim 1, wherein the program code portion comprises compiled code.

9. A non-transitory computer readable storage medium having a plurality of program code segments of a program code portion stored thereon, said program code segments defining a sequence of code segments, wherein said sequence of code segments comprises a root-code segment and a plurality of sub-code segments;

wherein each sub-code segment comprises an integrity checking portion for causing a computer to check the integrity of a target code segment of the program code portion, said target code segment for a given sub-code segment being the code segment that is sequentially adjacent in a checking direction towards said root-code segment;

wherein execution by a computer of the integrity checking portion of a given sub-code segment stored in a memory cause the computer to carry out a checking procedure on the respective target code segment stored in the memory to obtain a runtime result, cause the computer to compare said runtime result with a reference result comprised in said given sub-code segment, cause the computer to determine that the program code portion has been modified if the runtime result is not related to the reference result, and cause the computer to write the runtime result to the given sub-code segment in the memory; and wherein the respective target code segment in the memory includes the runtime result provided by the integrity checking portion of the respective target code segment.

10. An integrity checking method performed by a computer for checking the integrity of a program portion, said program portion comprising a plurality of code segments and having at least one sequence of code segments comprising a root code segment and a plurality of sub-code segments, the integrity checking method comprising, when the computer executes a given sub-code segment of said program portion loaded in the memory:

i) performing, by the computer, a runtime checking procedure comprised in said given sub-code segment, which checks a target code segment of said given sub-code segment, stored in the memory to obtain a first runtime result, said target code segment being the code segment that is sequentially adjacent in a checking direction towards said root-code segment;

ii) comparing, by the computer, said first runtime result with a reference result comprised in said given sub-code segment in the memory;

iii) determining that the program code portion has been modified if the first runtime result is not related to the reference result; and iv) writing, by the computer, said first runtime result into the given code segment in the memory, the target code segment as stored in the memory including, for cases other than the target code segment being the root code segment, a second runtime result obtained by performance of a runtime checking procedure comprised in the target segment.

11. A non-transitory recording medium storing a computer program, which, when loaded into and executed by a computer, causes the computer to carry out the integrity checking method of claim 10.

12. A system comprising:

a computer;

a memory comprising computer executable instructions which when executed by the computer cause the computer to:

read a program code portion stored in a first memory and divided into a plurality of code segments, said program code portion comprising at least one sequence of code segments comprising a root-code segment and a plurality of sub-code segments;

insert into each of said sub-code segments stored in said first memory an integrity checking portion for checking the integrity of a target code segment of the program code portion, said target code segment of given sub-code segment being the code segment that is sequentially adjacent in a checking direction towards said root-code segment;

wherein execution by a processor of the integrity checking portion of a given sub-code segment loaded in a second memory, including carrying out a checking procedure on the respective target code segment in the second memory to obtain a runtime result, comparing said runtime result with a reference result comprised in said given sub-code segment in the second memory, determining that the program code portion has been modified if the runtime result is not related to the reference result, and writing said runtime result into the given sub-code segment in the second memory, such that the integrity checking procedure of a further sub-code segment sequentially adjacent in a checking direction away from said root-code segment carries out the checking procedure on the given sub-code segment in the second memory including the runtime result;

compute the reference result of the target code segment of each of said sub-code segments; and write the computed reference results into said sub-code segments stored in said first memory.

13. The system as claimed in claim 12, wherein said integrity checking portion of one said sub-code segment defines a checking procedure causing the processor to perform a checksum computation on the target code segment stored in the second memory.

14. The system as claimed in claim 13, wherein the checking procedure causes the processor to perform a cyclic redundancy check.

15. The system as claimed in claim 12, wherein the program code portion is divided into code segments such that each segment comprises a function of the program code portion.

16. The system as claimed in claim 12, wherein said root code segment comprises an attribute specifying portion which defines a specified attribute of the program code portion.

17. The system as claimed in claim 12, wherein said program code portion comprises a plurality of code sequences, one or more code segments forming part of more than one code sequence.

18. The system as claimed in claim 12, configured to define a topology to represent the arrangement of the code segments in said sequence within the program code portion.

19. The system as claimed in claim 12, wherein the program code portion comprises compiled code.

20. A system comprising:
a computer;
a memory comprising computer executable instructions which when executed by the computer cause the computer to:
   execute a given sub-code segment of a program portion loaded in a memory, the program portion comprising a plurality of code segments and having at least one sequence of code segments comprising a root code segment and a plurality of sub-code segments:
perform a runtime checking procedure comprised in said given sub-code segment, the computer when performing the checking procedure being configured to:
  i) check a target code segment of said given sub-code segment, stored in the memory to obtain a first runtime result, said target code segment being the code segment that is sequentially adjacent in a checking direction towards said root-code segment;
  ii) compare said first runtime result with a reference result comprised in said given sub-code segment in the memory;
  iii) determine that the program code portion has been modified if the first runtime result is not related to the reference result; and
write said first runtime result into the given code segment in the memory, the target code segment as stored in the memory including, for cases other than the target code segment being the root code segment, a second runtime result obtained by performance of a runtime checking procedure comprised in the target segment.

* * * * *